No. 706,560. Patented Aug. 12, 1902.
A. HILDEBRAND.
TRACTION ENGINE TENDER.
(Application filed Apr. 8, 1902.)
(No Model.)
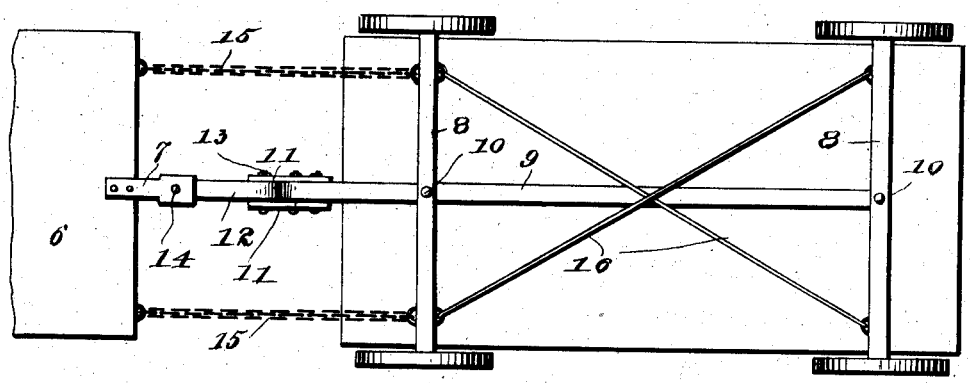
WITNESSES:
Elizabeth A. Jordan
Mary C. King
INVENTOR
Albert Hildebrand
BY
Milo B. Stevens & Co.
ATTORNEYS.

UNITED STATES PATENT OFFICE.

ALBERT HILDEBRAND, OF HUTCHINS, IOWA.

TRACTION-ENGINE TENDER.

SPECIFICATION forming part of Letters Patent No. 706,560, dated August 12, 1902.

Application filed April 8, 1902. Serial No. 101,893. (No model.)

*To all whom it may concern:*

Be it known that I, ALBERT HILDEBRAND, a citizen of the United States, residing at Hutchins, in the county of Hancock and State of Iowa, have invented certain new and useful Improvements in Gear for Traction-Engine Tenders; and I do hereby declare the following to be a full, clear, and exact description of the invention, such as will enable others skilled in the art to which it appertains to make and use the same, reference being had to the accompanying drawing, and to the figures of reference marked thereon, which forms a part of this specification.

This invention relates to gear for traction-engines, and particularly comprises means to drawing and guiding a tender or tank behind the engine.

The object of the invention is to construct a gear whereby the tender will track with the engine and be guided thereby in running either forward or backward. This will be found particularly useful for threshing outfits, as the engine and tender can be backed up to the separator, and in drawing the same on the road the tender and separator will follow in the engine tracks and not be ditched when turning corners.

The invention is illustrated in the accompanying drawing, in which the figure is a bottom plan view, partly broken away, of the running-gear of an engine and tender.

Referring specifically to the drawing, 6 indicates the platform or rear end of a traction-engine, and 7 the draw-bar thereof. The axles of the tender are indicated at 8 and are connected to the reach 9 by king-bolts at 10. At the front end of the reach is a joint or coupling formed for the purpose of allowing vertical play or movement between the engine and tender. This joint is formed by side plates 11, bolted to each side of the reach, and a link 12, held between the projecting ends of the plate by horizontal pivot-bolt 13.

The link swings vertically, but not laterally. The link is joined at its forward end to the draw-bar of the engine by an ordinary vertical pin-coupling, as at 14. At each side of the draw-bar the front axle of the tender is connected to the engine by a chain 15, and the front and rear axles of the tender are connected to each other by rods 16, which extend diagonally and work across each other from one end of the front axle to the opposite end of the rear axle. Turning movement of the engine is communicated by the guide-chains to the front axle of the tender and thence oppositely to the rear axle of the tender, causing the latter to follow the same curve as the former and to track with the engine.

What I claim is—

1. The combination with a traction-engine having a draw-bar, of a wheeled vehicle having pivoted front and rear axles, a draft-reach projecting before the body of the vehicle with horizontal rigidity, a coupling joining the draw-bar and reach, and flexible connections between the rear end of the engine and the front axle retaining them in parallelism.

2. The combination with a traction-engine having a draw-bar at the rear end thereof, of a tender having pivoted front and rear axles and wheels thereon, a draft-reach rigid with the body of the tender and projecting in advance thereof, a joint in the reach permitting vertical but preventing horizontal play, a coupling between the end of the reach and the draw-bar, and flexible guide connections between the rear end of the engine and the front axle retaining them in parallelism.

In testimony whereof I affix my signature in presence of two witnesses.

ALBERT HILDEBRAND.

Witnesses:
 WESLEY ALDRIDGE,
 GLADYS BELLAND.